US011270029B2

(12) United States Patent
Yang et al.

(10) Patent No.: US 11,270,029 B2
(45) Date of Patent: Mar. 8, 2022

(54) DATA CHECK METHODS, APPARATUSES, AND DEVICES

(71) Applicant: ALIPAY (HANGZHOU) INFORMATION TECHNOLOGY CO., LTD., Zhejiang (CN)

(72) Inventors: Renhui Yang, Hangzhou (CN); Xinmin Wang, Hangzhou (CN); Yuan Chen, Hangzhou (CN); Wenyu Yang, Hangzhou (CN); Feng Qian, Hangzhou (CN); Qianting Guo, Hangzhou (CN); Shubo Li, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/364,528

(22) Filed: Jun. 30, 2021

(65) Prior Publication Data
US 2021/0326486 A1   Oct. 21, 2021

(30) Foreign Application Priority Data
Aug. 31, 2020   (CN) .......................... 202010900858.9

(51) Int. Cl.
*G06F 12/14*   (2006.01)
*G06F 21/64*   (2013.01)
(Continued)

(52) U.S. Cl.
CPC .......... *G06F 21/64* (2013.01); *G06F 21/602* (2013.01); *G06F 21/6245* (2013.01);
(Continued)

(58) Field of Classification Search
CPC .... G06F 21/64; G06F 21/602; G06F 21/6245; H04L 63/0428; H04L 9/0643;
(Continued)

(56) References Cited

U.S. PATENT DOCUMENTS 10,097,544 B2 * 10/2018 Koved .................. H04L 63/083
10,462,112 B1 * 10/2019 Makmel ............... H04L 9/0861
(Continued)

FOREIGN PATENT DOCUMENTS

CN   108762686 A   11/2018
CN   109615386 A    4/2019
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Amare F Tabor
(74) *Attorney, Agent, or Firm* — Fish & Richardson P.C.

(57) ABSTRACT

Examples in this application disclose data check computer-implemented methods, media, and systems. One example computer-implemented method includes retrieving, by a trusted execution environment (TEE), a check-triggering instruction from a server, where the check-triggering instruction is configured to trigger the TEE to perform a consistency check on basic data of a user to be identified, in response to the check-triggering instruction, retrieving, by the TEE, encrypted standard basic data of the user from a trusted institution, retrieving, by the TEE, encrypted basic data of the user from a first institution, retrieving, by the TEE, the basic data of the user by decrypting the encrypted basic data, performing, by the TEE, the consistency check on the basic data of the user based on the encrypted standard basic data to obtain a check result, and sending, from the TEE, the check result to a second institution.

20 Claims, 4 Drawing Sheets

(51) Int. Cl.
*G06F 21/60* (2013.01)
*G06F 21/62* (2013.01)
*G06Q 20/38* (2012.01)
*G06Q 20/40* (2012.01)
*G06Q 40/02* (2012.01)
*G06Q 40/04* (2012.01)
*H04L 9/06* (2006.01)
*H04L 29/06* (2006.01)

(52) U.S. Cl.
CPC ....... *G06Q 20/389* (2013.01); *G06Q 20/4014* (2013.01); *G06Q 40/02* (2013.01); *G06Q 40/04* (2013.01); *H04L 9/0643* (2013.01); *H04L 63/0428* (2013.01); *H04L 2209/38* (2013.01)

(58) Field of Classification Search
CPC .............. H04L 2209/38; G06Q 20/389; G06Q 20/4014; G06Q 40/02; G06Q 40/04
USPC .......................................................... 726/23
See application file for complete search history.

(56) References Cited

U.S. PATENT DOCUMENTS

| | | | | |
|---|---|---|---|---|
| 10,839,070 | B1* | 11/2020 | Wei | H04L 9/0894 |
| 10,862,689 | B1* | 12/2020 | Aizikovich | H04L 9/0825 |
| 10,917,233 | B2* | 2/2021 | Ojha | G06F 21/64 |
| 2020/0036531 | A1* | 1/2020 | Minovic | H04L 63/0442 |

FOREIGN PATENT DOCUMENTS

| | | |
|---|---|---|
| CN | 110070428 A | 7/2019 |
| CN | 110580418 A | 12/2019 |
| CN | 111090888 A | 5/2020 |
| CN | 111147432 | 5/2020 |
| CN | 111316303 A | 6/2020 |

OTHER PUBLICATIONS

Nakamoto, "Bitcoin: A Peer-to-Peer Electronic Cash System," www.bitcoin.org, 2005, 9 pages.

Chidell, dchidell.com [online], "Replacing cron jobs with Jenkins," Jun. 14, 2017, retrieved on Dec. 3, 2021, retrieved from URL<https://blog.dchidell.com/2017/06/14/replacing-cron-jobs-with-jenkins/>, 6 pages.

Dhiren et al., "KYC as a Service (KASE)—A Blockchain Approach," International Conference on Modelling, Simulation & Intelligent Computing, MoSICom, Jan. 29, 2020, 9 pages.

Extended European Search Report in European Application No. 21181988.3, dated Dec. 9, 2021, 12 pages.

Nguyen et al., "CVSS: A Blockchainized Certificate Verifying Support System," The Ninth International Symposium on Information and Communication Technology, Dec. 6, 2018, pp. 436-442.

windowscentral.com [online], "How to create an automated task using Task Scheduler on Windows 10," Jan. 30, 2019, retrieved on Dec. 3, 2021, retrieved from URL<https://www.windowscentral.com/how-create-automated-task-using-task-scheduler-windows-10>, 23 pages.

\* cited by examiner

DATA CHECK METHODS, APPARATUSES, AND DEVICES

CROSS-REFERENCE TO RELATED APPLICATIONS

This application claims priority to Chinese Patent Application No. 202010900858.9, filed on Aug. 31, 2020, which is hereby incorporated by reference in its entirety.

TECHNICAL FIELD

The present application relates to the field of blockchain technologies, and in particular, to data check methods, apparatuses, and devices.

BACKGROUND

Know your customer (KYC) means that the relevant laws and regulations of the current industry require natural persons, legal persons and other organizations to make a comprehensive understanding of their customers, that is, the principle of knowing customers. The main objective is to effectively identify and report suspicious behavior by verifying the customer identity and knowing commercial behavior so as to reasonably and effectively identify abnormal or possibly suspicious behavior from the customer's daily and habitual behavior. It includes the knowledge of the customer identity, the purpose of the transaction, the source and destination of the funds, the daily business activities and financial transactions of the customer, etc. during the establishment of a business relationship with the customer, and it is the basis of anti-money laundering.

SUMMARY

The objective of the present disclosure is to provide data check methods, apparatuses, and devices, including the following:

Provided is a data check method, applied to a privacy computing unit and including:

obtaining a check-triggering instruction sent by an external server; obtaining encrypted standard basic data of a to-be-identified user from a trusted institution in response to the check-triggering instruction; and performing a consistency check on basic data of the to-be-identified user based on the standard basic data, where the basic data of the to-be-identified user is obtained by decrypting encrypted basic data of the to-be-identified user uploaded by a first institution.

Provided is a data check trigger method, including:

obtaining, by an external server, time information used to indicate a current moment, where periodic trigger logic is deployed in the external server; determining whether the time information satisfies a periodic trigger rule in the periodic trigger logic, to obtain a determining result; and sending a check-triggering instruction to a privacy computing unit if the determining result indicates that the time information satisfies the periodic trigger rule in the periodic trigger logic, where the check-triggering instruction is used to trigger the privacy computing unit to perform a consistency check on basic data of a to-be-identified user based on encrypted standard basic data of the to-be-identified user obtained from a trusted institution, and the basic data of the to-be-identified user is obtained by decrypting encrypted basic data of the to-be-identified user uploaded by a first institution.

Provided is a data check apparatus, applied to a privacy computing unit and including: a check-triggering instruction acquisition module, configured to obtain a check-triggering instruction sent by an external server; a standard basic data acquisition module, configured to obtain encrypted standard basic data of a to-be-identified user from a trusted institution in response to the check-triggering instruction; and a check module, configured to perform a consistency check on basic data of the to-be-identified user based on the standard basic data, where the basic data of the to-be-identified user is obtained by decrypting encrypted basic data of the to-be-identified user uploaded by a first institution.

Provided is a data check trigger apparatus, including: a time information acquisition module, configured to obtain, by an external server, time information used to indicate a current moment, where periodic trigger logic is deployed in the external server; a determining module, configured to determine whether the time information satisfies a periodic trigger rule in the periodic trigger logic, to obtain a determining result; and a check-triggering instruction sending module, configured to send a check-triggering instruction to a privacy computing unit if the determining result indicates that the time information satisfies the periodic trigger rule in the periodic trigger logic, where the check-triggering instruction is used to trigger the privacy computing unit to perform a consistency check on basic data of a to-be-identified user based on encrypted standard basic data of the to-be-identified user obtained from a trusted institution, and the basic data of the to-be-identified user is obtained by decrypting encrypted basic data of the to-be-identified user uploaded by a first institution.

Provided is a data check device, including: at least one processor; and a memory communicatively connected to the at least one processor, where the memory stores instructions that can be executed by the at least one processor, and the instructions are executed by the at least one processor to enable the at least one processor to: obtain a check-triggering instruction sent by an external server; obtain encrypted standard basic data of a to-be-identified user from a trusted institution in response to the check-triggering instruction; and perform a consistency check on basic data of the to-be-identified user based on the standard basic data, where the basic data of the to-be-identified user is obtained by decrypting encrypted basic data of the to-be-identified user uploaded by a first institution.

Provided is a data check trigger device, including: at least one processor; and a memory communicatively connected to the at least one processor, where the memory stores instructions that can be executed by the at least one processor, and the instructions are executed by the at least one processor to enable the at least one processor to: obtain time information used to indicate a current moment, where periodic trigger logic is deployed in the external server; determine whether the time information satisfies a periodic trigger rule in the periodic trigger logic, to obtain a determining result; and send a check-triggering instruction to a privacy computing unit if the determining result indicates that the time information satisfies the periodic trigger rule in the periodic trigger logic, where the check-triggering instruction is used to trigger the privacy computing unit to perform a consistency check on basic data of a to-be-identified user based on encrypted standard basic data of the to-be-identified user obtained from a trusted institution, and the basic data of the to-be-identified user is obtained by decrypting encrypted basic data of the to-be-identified user uploaded by a first institution.

The embodiments of the present specification can achieve the following beneficial effects: A check-triggering instruction sent by an external server is obtained; encrypted standard basic data of a to-be-identified user is obtained from a trusted institution in response to the check-triggering instruction; and a consistency check is performed on basic data of the to-be-identified user based on the standard basic data. According to the methods, an identity check process of a user can be triggered by using the external server, to satisfy a need to actively trigger KYC check of the user. In addition, performing KYC check on the user with reference to the standard basic data provided by the trusted institution can ensure the accuracy of a KYC check result.

BRIEF DESCRIPTION OF DRAWINGS

To describe technical solutions in the embodiments of the present specification or in the existing technology more clearly, the following briefly describes the accompanying drawings required for describing the embodiments or the existing technology. Clearly, the accompanying drawings in the following description merely show some embodiments of the present application, and a person of ordinary skill in the art can still derive other drawings from these accompanying drawings without creative efforts.

DESCRIPTION OF EMBODIMENTS

To make the objectives, technical solutions, and advantages of one or more embodiments of the present specification clearer, the following clearly describes the technical solutions of the one or more embodiments of the present specification with reference to corresponding accompanying drawings and specific embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of the one or more embodiments of the present specification.

In the Internet field, a user registers identity information with each institution through the Internet platform, and implements various services through the Internet platform. Each institution needs to determine the user's identity to process the service of the user. Therefore, verifying the authenticity of the user's identity is a need of each institution for processing the service. The following uses anti-money laundering (AML) as an example for description.

The AML refers to measures taken to prevent money laundering activities of disguising or concealing the income and its source and property of a drug crime, an organized crime of the underworld, a crime of terrorist activities, a crime of smuggling, a crime of embezzlement and bribery, a crime of violating a financial management order, etc. in various ways. Common money laundering encompasses banking, insurance, securities, real estate, and other fields. Most anti-money laundering work includes three core items:

1. Customer identity identification system. During the establishment of a business relationship or transaction with the customer, the subject matter obligations for anti-money laundering should verify and record the customer identity based on a real and valid identity card, and update the customer identity information in a timely way during the presence of the business relationship.

2. Suspicious transaction report (STR) system. Illegal fund flows are usually characterized by large amounts and abnormal transactions. Therefore, relevant laws specifies the suspicious transaction report system, which requires financial institutions to report transactions with amounts reaching a certain criterion and abnormal transactions without legal purposes to the anti-money laundering administrative department in a timely way for the purpose of tracing illegal crimes.

3. Customer identity information and transaction record storage system. Customer identity information and transaction record storage means that financial institutions take necessary measures to store the customer identity information and transaction information for a certain period of time according to laws, to provide evidence for tracing illegal crimes.

The customer identity identification system is often called "know your customer (KYC)", which means obtaining customer related identification information, including the knowledge of the customer identity, the purpose of the transaction, the source and destination of the funds, the daily business activities and financial transactions of the customer, etc. during the establishment of a business relationship with the customer, and is the basis of anti-money laundering.

In actual applications, a KYC check result of each institution needs to be checked based on the regulatory requirements. For the KYC check, there is only a method that the institutions initiate the transactions to trigger the smart contract to perform KYC check. However, in actual applications, KYC check may need to be actively triggered.

To solve the previously described problems, the technical solutions provided in the embodiments of the present specification are described in detail below with reference to the accompanying drawings.

Figure 1:
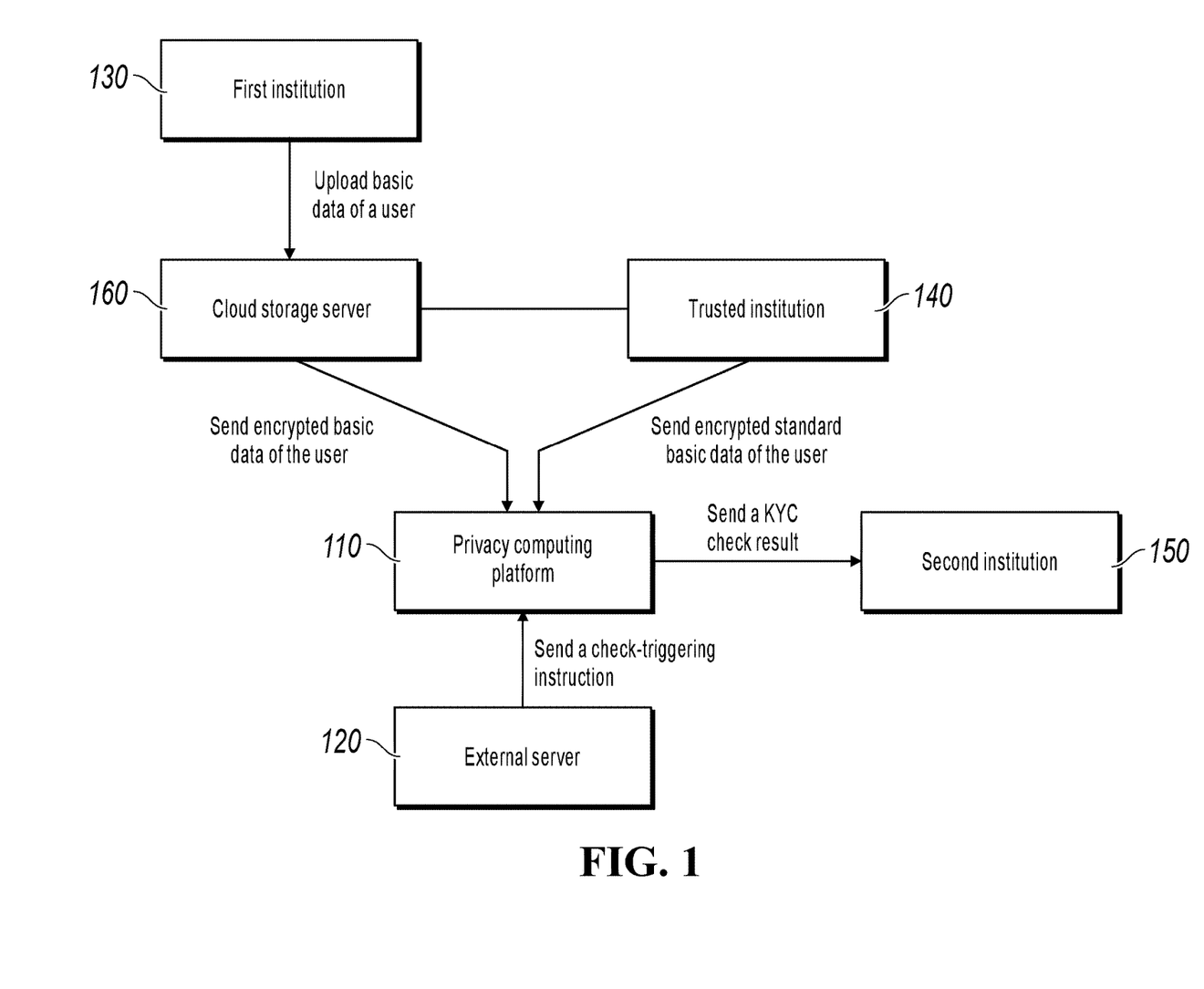
FIG. 1 is a schematic diagram illustrating a system architecture of a data check method, according to one or more embodiments of the present specification.

FIG. 1 is a schematic diagram illustrating a system architecture of a data check method, according to one or more embodiments of the present specification. FIG. 1 shows an embodiment of a data check method provided in the present application. The following roles in FIG. 1 can be included: a privacy computing platform 110, an external server 120, a first institution 130, a trusted institution 140, a second institution 150, and a cloud storage server 160.

The first institution 130 can be a consignment agency, the second institution 150 can be a financial institution, and the privacy computing platform 110 can be deployed in a blockchain system, or can be deployed in a device outside a blockchain system. The first institution 130 can directly receive user information so as to complete certain processing work, for example, KYC check mentioned in the KYC scenario, based on the user information. In addition, the first institution 130 can provide a KYC check result to the outside, or can provide basic data needed for the KYC check to the outside. The first institution 130 can store basic data of a user in the cloud storage server 160. When a privacy computing unit in the privacy computing platform 110 needs to perform a consistency check on the basic data of the user, the privacy computing unit can obtain the basic data of the user from the cloud storage server 160, or certainly, can obtain the basic data of the user directly from the first institution 130. The privacy computing platform 110 can perform KYC check in a trusted security computing environment. The external server 120 periodically sends a check-triggering instruction to the privacy computing platform 110 to trigger the privacy computing unit in the privacy computing platform 110 to perform KYC check. When performing KYC check, the privacy computing unit can obtain encrypted standard basic data of the user from the trusted institution 140, and perform consistency verification on the basic data of the user based on the standard basic data. The privacy computing platform 110 can send a check result obtained after the check to the second institution 150 based on an acquisition request of the second institution 150. In some situations, the privacy computing platform 110 can actively send the KYC check result to the second institution 150.

Next, a start information verification method provided in the embodiments of the present specification is specifically described with reference to the accompanying drawings.

Embodiment 1

Figure 2:
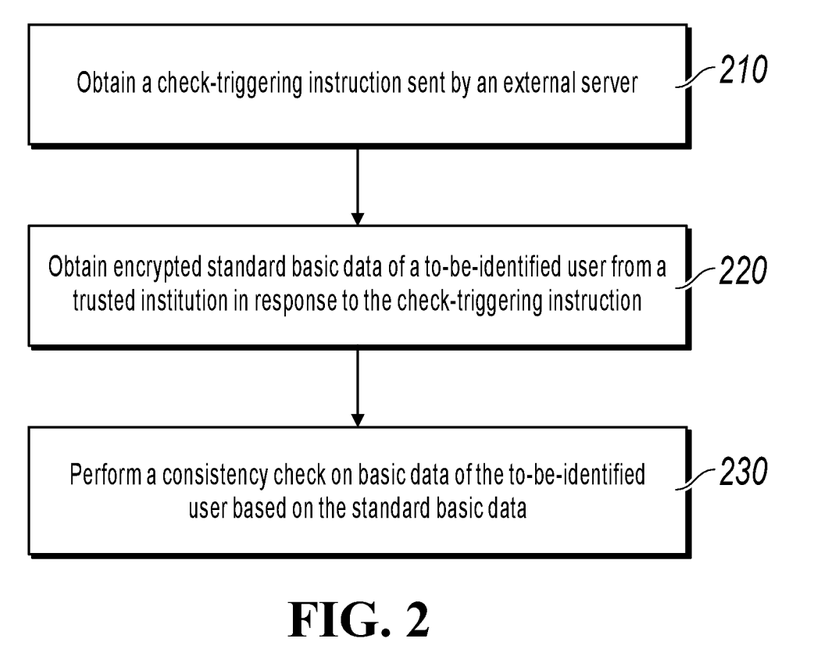
FIG. 2 is a flowchart illustrating a data check method, according to one or more embodiments of the present specification.

FIG. 2 is a flowchart illustrating a data check method, according to one or more embodiments of the present specification. From the perspective of program, the process can be performed by a program or an application client device mounted on an application server. The execution body in the embodiments of the present specification can be an application service cluster responsible for privacy computing. The server cluster can include one or more application services. These application services can exchange data with a blockchain network, or can be deployed in a blockchain network. In the following embodiments, for ease of description, the application server cluster responsible for privacy computing can be replaced with a "privacy computing unit".

As shown in FIG. 2, the process can include the following steps.

Step 210: Obtain a check-triggering instruction sent by an external server.

The check-triggering instruction can be an operation instruction for requesting to trigger authenticity verification on a user's identity, and the check-triggering instruction can include at least user identification information corresponding to a user requesting to be verified.

Optionally, the check-triggering instruction can be sent by the external server based on a periodic trigger rule. The external server can be a timing server deployed separately to trigger information verification periodically. In actual applications, the periodic trigger rule can be deployed in the external server. The external server sends the check-triggering instruction to the privacy computing unit when detecting that current event information satisfies the periodic trigger rule.

The periodic trigger rule can include predetermined duration and a predetermined start moment. For example, the periodic trigger rule can be triggering KYC check once every two hours, or can be triggering KYC check at 8:00 a.m. every day. Specifically, a timing function service can be deployed in the external server, and the timing function service can record time. When time duration of the timing function service reaches the predetermined duration or the current moment recorded by the timing function service reaches the predetermined start moment, the external server can send the check-triggering instruction to the privacy computing unit to trigger the privacy computing unit to perform KYC check.

In actual applications, although the periodic trigger rule is not satisfied, it is possible that a large amount of to-be-checked data has been stored in a cloud storage server, which causes excessive load pressure on the server. However, because the periodic trigger rule is not satisfied, to-be-checked data uploaded by the user cannot be sent to the privacy computing unit. To solve this technical problem, the external server can further monitor a data amount of to-be-checked data in the cloud storage server. Even if the periodic trigger rule is not satisfied, the privacy computing unit can be triggered to perform KYC check to reduce load pressure on the cloud storage server once the amount of data in the cloud storage server reaches a predetermined data amount threshold.

It is worthwhile to note that the cloud storage server can be an object storage service (OSS), or can be another cloud storage server, which is not specifically limited in the embodiments of the present specification.

Step 220: Obtain encrypted standard basic data of a to-be-identified user from a trusted institution in response to the check-triggering instruction.

The trusted institution can represent an institution specifically responsible for user information management, or can be a related enterprise that can obtain and maintain user identity information, for example, a public security bureau or an insurance company.

The to-be-identified user can be an individual user, an enterprise user, etc. For the individual user, the basic data can include some or all of the information such as a name, a gender, a nationality, a certificate type, a certificate number, an age, an occupation, a mobile phone number, a contact address, etc. of the individual. For the enterprise user, the basic data can include some or all of the information such as a name, a business license number, an address of a business place, a legal representative's name, a certificate type, a certificate number, a validity period, etc. of the enterprise. Most of the information is relatively sensitive. Therefore, during transmission, the basic data needs to be encrypted and then transmitted so as to ensure the security of the basic data of the user.

Optionally, before the performing a consistency check on basic data of the to-be-identified user based on the standard basic data, the method can further include the following:

The encrypted standard basic data of the to-be-identified user obtained from the trusted institution is decrypted to obtain the standard basic data.

Step 230: Perform a consistency check on basic data of the to-be-identified user based on the standard basic data, where the basic data of the to-be-identified user is obtained by decrypting encrypted basic data of the to-be-identified user uploaded by a first institution.

The first institution can be a consignment agency. The consignment agency can be an institution that sells financial products as a proxy. In actual applications, there is a cooperative relationship between a financial institution of some financial products and a consignment agency. The financial institution sells financial products of the financial institution through the consignment agency. For example, the network platform sells financial products of a fund company as a proxy.

In actual applications, the standard basic data of the to-be-identified user obtained from the trusted institution is trustworthy. Performing KYC check on an identity of the to-be-identified user can mean determining whether the basic data of the to-be-identified user uploaded by the first institution is real data. Specifically, if the basic data of the to-be-identified user is consistent with the standard basic data, it can be determined that the basic data of the to-be-identified user uploaded by the first institution is real data. Otherwise, it can be determined that the basic data of the to-be-identified user uploaded by the first institution is false data. Specifically, the performing a consistency check on basic data of the to-be-identified user based on the standard basic data can specifically include: comparing the basic data of the to-be-identified user with the standard basic data to obtain a check result; and when the check result indicates that the basic data of the to-be-identified user is consistent with the standard basic data, determining that the basic data of the to-be-identified user uploaded by the first institution is real data; or when the check result indicates that the basic data of the to-be-identified user is inconsistent with the standard basic data, determining that the basic data of the to-be-identified user uploaded by the first institution is false data.

When performing KYC check, the privacy computing unit needs to obtain, from the cloud storage server, the basic data of the to-be-identified user on which KYC check needs to be performed. The cloud storage server is configured to store basic data of each user uploaded by each institution. The basic data of the to-be-identified user in the present step is consistent with the "basic data" described in step 220. Therefore, during transmission, the basic data also needs to be encrypted and then transmitted so as to ensure the security of the basic data of the user.

Specifically, the encrypted basic data of the to-be-identified user uploaded by the first institution can be encrypted by the first institution through symmetric encryption or asymmetric encryption and then uploaded to the cloud storage server for storage, or can be encrypted by the cloud storage server and then sent to the privacy computing unit after the first institution uploads the basic data to the cloud storage server. If symmetric encryption is used, that is, an encryption key and a decryption key are the same key, the key can be obtained between the first institution and the privacy computing unit through a key negotiation process. When asymmetric encryption is used, that is, an encryption key and a decryption key are two different but corresponding keys, where one is a public key used for encryption, and the other is a private key used for decryption, generally, the first institution can encrypt the basic data by using the public key of the privacy computing unit, and then send the encrypted basic data to the privacy computing unit, so that the privacy computing unit decrypts the encrypted basic data by using the corresponding private key to restore the basic data of the to-be-identified user.

To further improve data transmission security, that is, although encrypted data is transmitted, an incorrect receiver is not expected to receive the data, before the basic data of the to-be-identified user is sent to the privacy computing unit, the identity of each other can be determined. For example, when the first institution uploads the basic data of the user to the cloud storage server, the first institution and the cloud storage server can determine the identity of each other. When the cloud storage server sends the basic data of the user to the privacy computing unit, the privacy computing unit and the cloud storage server can determine the identity of each other, and the first institution and the privacy computing unit can also determine the identity of each other. The identity of each other can be determined in various ways. An implementation using a distributed digital identity technology of the blockchain is described here. The blockchain can provide a decentralized (or weakly centralized), tamper-resistant (or difficult to tamper with), and trustworthy distributed ledger, and can provide a secure, stable, transparent, auditable, and efficient method for recoding transactions and data information exchange. The blockchain network can include multiple nodes. Generally, one or more nodes in the blockchain network belong to one participant. Generally, the more participants in the blockchain network and the more authoritative the participants are, the more trustworthy the blockchain network is. Here, the blockchain network including multiple participants is referred to as a blockchain platform. The identity of a financial institution can be verified through the blockchain platform.

To use the distributed digital identity service provided by the blockchain platform, the first institution, a second institution, the trusted institution, and the privacy computing unit can register the identity of the first institution, the second institution, the trusted institution, and the privacy computing unit with the blockchain platform. For example, the first institution can create a public-private key pair, where the private key is stored secretly, and can create a distributed digital identity (also referred to as a decentralized identifier (DID)). The first institution can create the DID, or can request a decentralized identity service (DIS) system to create the DID. The DIS is a blockchain-based identity management solution that can provide functions such as creating, verifying and managing digital identities, so as to manage and protect entity data normatively, ensure the authenticity and efficiency of information flow, and solve problems such as cross-institution identity authentication and data cooperation. The DIS system can be connected to the blockchain platform. The DIS system can create a DID for the first institution, send the DID and the public key to the blockchain platform for storage, and also return the created DID to the first institution. The public key can be included in a DIDdoc, which can be stored in the blockchain platform. The DIS can create a DID for a financial institution based on the public key sent by the first institution. For example, the DIS creates a DID after performing calculation on the public key of the first institution by using a hash function. Or, the DIS can create a DID based on other information (which can include the public key or may not include the public key) of the first institution. For the latter, the first institution may need to provide some information besides the public key.

The privacy computing unit can be a privacy computing unit deployed in a blockchain system, or can be a privacy computing unit deployed in a device outside a blockchain system. Before being used, the privacy computing unit can prove that the privacy computing unit is trustworthy to the user. The process of proving the privacy computing unit to be trustworthy can involve a remote certificate report. The process of proving an on-chain privacy computing unit to be trustworthy by the on-chain privacy computing unit is similar to the process of proving an off-chain privacy computing unit to be trustworthy by the off-chain privacy computing unit. For example, for the off-chain privacy computing unit, a remote certificate report is generated in a remote certificate process of an off-chain trusted execution environment (TEE) on the off-chain privacy computing unit.

The remote certificate report can be generated after an authoritative authentication server verifies self-recommendation information generated by the off-chain privacy computing unit. The self-recommendation information is related to the off-chain TEE created on the off-chain privacy computing unit. The off-chain privacy computing unit generates the self-recommendation information related to the off-chain TEE, and the authoritative authentication server verifies the self-recommendation information to generate the remote certificate report, so that the remote certificate report can be used to indicate that the off-chain TEE on the off-chain privacy computing unit is trustworthy.

For example, when sending the standard basic data of the user to the privacy computing unit in the device outside the blockchain system, the trusted institution can first verify whether the privacy computing unit is trustworthy. Specifically, the trusted institution can initiate a challenge to the off-chain privacy computing unit, and receive the remote certificate report returned by the off-chain privacy computing unit. For example, the trusted institution can initiate an off-chain challenge to the off-chain privacy computing unit, in other words, the process of initiating the challenge can be independent of the blockchain network, so that a consensus process between blockchain nodes can be skipped and on-chain-off-chain interaction operations can be reduced. As such, the challenge of the trusted institution to the off-chain privacy computing unit has higher operation efficiency. For another example, the trusted institution can make an on-chain challenge. For example, the trusted institution can submit a challenge transaction to a blockchain node, challenge information included in the challenge transaction can be transmitted by the blockchain node to the off-chain privacy computing unit by using an oracle mechanism, and the challenge information is used to initiate a challenge to the off-chain privacy computing unit. Regardless of the on-chain challenge or the off-chain challenge, after obtaining the remote certificate report, the challenger (e.g., the trusted institution) can verify the signature of the remote certificate report based on a public key of the authoritative authentication server, and can determine that the off-chain privacy computing unit is trustworthy if the verification succeeds.

The off-chain privacy computing platform can store a public-private key pair in the TEE. The public key can be sent to the other party in a process such as the remote certificate process, and the private key is properly stored in the TEE. When determining that the off-chain privacy computing unit is trustworthy based on the remote certificate report, the trusted institution can encrypt and transmit byte code of an off-chain contract to the off-chain privacy computing unit, so that the off-chain privacy computing unit decrypts the encrypted byte code in the off-chain TEE to obtain the byte code and deploy the byte code. The public key can be used for the previously described encryption. In the previous process, after a contract is deployed, the off-chain privacy computing unit can store the contract, and calculate a hash value of the contract. The hash value of the contract can be fed back to the deployment party of the contract. The deployment party can locally generate a hash value for the deployed contract. Therefore, the deployment party can determine whether the hash value of the deployed contract is the same as the local hash value of the contract through comparison. If they are the same, it indicates that the contract deployed in the off-chain privacy computing unit is a contract deployed by the deployment party. The content transmitted by the off-chain privacy computing unit can be signed by using the private key stored in the TEE so as to prove that the content is an execution result of the TEE. Actually, multiple smart contracts can be deployed in one TEE, and the TEE can generate a separate public-private key pair for each smart contract. Therefore, each deployed smart contract can have an ID (e.g., the public key corresponding to the smart contract or a string generated based on the public key), and an execution result of each smart contract can also be signed by using the private key that is properly stored in the TEE and corresponds to the smart contract. As such, it can be proved that a result is an execution result of a specific contract in an off-chain privacy computing unit. Therefore, execution results of different contracts can be signed by using different private keys, and only a corresponding public key can verify the signature, in other words, the result cannot be proved to be an execution result of a corresponding contract if a corresponding public key cannot verify the signature, which equivalently means that an identity is assigned to a contract deployed in the off-chain privacy computing unit by using a public-private key pair. The off-chain privacy contract is used as an example above. The on-chain privacy contract is also similar, and can also have an identity, that is, have a public-private key pair.

Subsequently, the off-chain privacy computing unit can provide a coordination to the deployed off-chain contract. Specifically, when a deployed off-chain contract is called, byte code of the deployed contract can be loaded and executed in the off-chain TEE, and an execution result can be fed back to a coordinator of the contract, or fed back to a receiver specified in the contract or a receiver specified in a transaction calling the contract, or fed back to the blockchain node by using the oracle mechanism. If the execution result is fed back to the blockchain node by using the oracle mechanism, the execution result can be further fed back to a receiver specified in the on-chain contract or a receiver specified in a transaction calling the on-chain contract through setting of the on-chain contract.

In addition, the execution result of the off-chain privacy computing unit can be output after being encrypted by using a private key. For example, if asymmetric encryption is used, a public key used for encryption can be a public key in a public-private key pair negotiated in the previous challenge process, or can be generated by a challenger by using the previous DIS service and then sent to the off-chain privacy computing unit. The challenger here can be the trusted institution in the embodiments of the present application, or can be the first institution, the second institution, or the cloud storage server. Therefore, by implementing previously described method, it can be ensured that data input to or output from the off-chain privacy computing unit is encrypted so as to ensure the security in a data transmission process. Similarly, the data input to the off-chain privacy computing unit can be signed by a sending party by using a private key of the sending party. The principles in the subsequent similar links are the same.

In the method of FIG. 2, a check-triggering instruction sent by an external server is obtained; encrypted standard basic data of a to-be-identified user is obtained from a trusted institution in response to the check-triggering instruction; and a consistency check is performed on basic data of the to-be-identified user based on the standard basic data. According to the method, an identity check process of a user can be triggered by using the external server, to satisfy a need to actively trigger KYC check of the user. In addition, performing KYC check on the user with reference to the standard basic data provided by the trusted institution can ensure the accuracy of a KYC check result.

Based on the method of FIG. 2, the embodiments of the present specification further provide some specific implementation solutions of the method, which are described below.

Optionally, before the performing a consistency check on basic data of the to-be-identified user based on the standard basic data, the method can further include the following:

obtaining, based on user identification information of the to-be-identified user from the cloud storage server, the encrypted basic data of the to-be-identified user corresponding to the user identification information.

Optionally, the user identification information can include:

an account that the to-be-identified user registers with the first institution; or an account allocated by a system of the first institution to the to-be-identified user when the to-be-identified user initiates a transaction operation to the first institution.

Optionally, the user identification information can include:

a digest value obtained by performing hash calculation on one or more pieces of information of the to-be-identified user.

Optionally, the user identification information can include:

a digest value obtained by performing salted hash calculation on one or more pieces of information of the to-be-identified user.

It is worthwhile to note that in the previous step, the user identification information can indicate information used to uniquely identify a user's identity. For example, the user identification information can be a user ID. The user ID can be an account that the user registers with a consignment agency, or an account allocated to the user by a system of the consignment agency when the user initiates a transaction operation to the consignment agency. Such an account can be, for example, a string of characters. The user ID should uniquely identify a user. A corresponding field is information of the individual user or the enterprise user described above.

For the individual user, if the certificate type is an identity card, the user ID can be an identity card number. However, the identity card number is actually also personal privacy data. Therefore, to avoid the leakage of personal privacy data, hash processing can be performed on the identity card number. Because the hash calculation has characteristics of being one-way and hiding original information, and a good hash function has an anti-collision capability, that is, hash values obtained for different inputs are very likely to be different, a hash calculation result (or referred to as a digest value) can be used as the user ID. The principle remains the same for the mobile phone number.

Similarly, hash calculation can be performed after a group of user data is sequentially spliced, and a digest value obtained is used as the user ID. For example, a digest value obtained by hashing "name+certificate type+certificate number" is used as the user ID, where "+" can indicate that characters are sequentially spliced. The anti-money laundering KYC generally has a relatively high requirement for data security. To further improve data security protection, an operation of adding salts can also be performed in hash calculation. For example, hashing is performed on "name+certificate type+certificate number+salt), where salt is a value generated based on a predetermined rule.

The consignment agency can remind the user to provide the basic data when the user registers, or can require the user to provide the basic data when the user initiates a transaction operation on the consignment platform. After obtaining the basic data provided by the user, the consignment agency can store the basic data provided by the user in the cloud storage server.

In actual applications, a single institution is often unable to obtain enough information to process a service, and therefore, there is a need to obtain information from other institutions. For example, many countries require financial institutions to provide anti-money laundering audit results in anti-money laundering compliance requirements. Currently, many central banks and large financial institutions in many countries have tried to improve the efficiency and accuracy and to satisfy regulatory requirements by using blockchains in the field of anti-money laundering. Meanwhile, as a resource, data's mobility and accessibility are the foundation of the development of many data applications and industries. However, privacy protection in data exchange and sharing is a big challenge to industry development. Taking the previous consignment agency and financial institution as examples, a customer who purchases financial products is usually a customer of the consignment agency. Based on the regulatory requirements, a KYC check result of a customer is needed when a financial product is sold. As mentioned above, the customer who purchases financial products is the customer of the consignment agency. Generally, the consignment agency can obtain basic information of the user directly, thus having the KYC check capability. Based on the requirement of data privacy protection, the consignment agency usually cannot directly transfer the basic data and the KYC result of KYC to the financial institution. The financial institution cannot perform independent KYC without the basic data of KYC. However, the financial institution also needs to have the KYC check result based on the regulatory requirements. Since the financial institution cannot perform KYC without basic data of KYC, and the duty of KYC is not carried out, the financial institution may fail to satisfy the regulatory requirements. To satisfy the regulatory requirements, not only the consignment agency needs to have the KYC check result of the customer, but also the financial institution needs to have the KYC check result of the customer.

The check result can be represented by {user ID, KYC check result}, where the KYC check result is, for example, "Pass" or "Failed", or the KYC check result can be "Real" or "False", etc. The privacy computing platform sends the check result to the financial institution, which includes directly sending the check result to the financial institution, and can also include sending the check result to a specified storage service medium and then extracting the check result from the storage service medium by the financial institution.

Therefore, after the comparing the basic data of the to-be-identified user with the standard basic data to obtain a check result, the method can further include the following:

The privacy computing unit receives a check result acquisition request sent by a second institution, where the check result acquisition request is used to request to obtain the check result obtained by performing a consistency check on the basic data of the to-be-identified user based on the standard basic data; and sends the check result to the second institution based on the check result acquisition request, where the second institution can be a financial institution.

The check result acquisition request sent by the second institution to the privacy computing unit can include the user identification information of the to-be-identified user, for example, the user ID of the to-be-identified user.

Optionally, a first smart contract can be deployed in the privacy computing unit, and the first smart contract is used to receive the check-triggering instruction sent by the external server, and perform the operation of performing a consistency check on the basic data of the to-be-identified user based on the standard basic data in response to the check-triggering instruction.

Optionally, a second smart contract is further deployed in the privacy computing unit, and the sending the check result to the second institution can specifically include:

calling the second smart contract to send the check result to the second institution.

It is worthwhile to note that the second smart contract and the first smart contract deployed in the privacy computing unit can be the same contract, and public-private key pairs of the first smart contract and the second smart contract can be the same, or the public-private key pair is equivalent to a public-private key pair of the privacy computing unit when the privacy computing unit includes only one smart contract. The first smart contract receives the check-triggering instruction sent by the external server, and performs the operation of performing a consistency check on the basic data of the to-be-identified user based on the standard basic data in response to the check-triggering instruction. After the check result is obtained, the second smart contract is called to send the check result to the second institution.

Optionally, after the determining that the basic data of the to-be-identified user uploaded by the first institution is real data, the method can further include the following:

The privacy computing unit generates a verifiable claim used to prove that the basic data of the to-be-identified user uploaded by the first institution is real data. The verifiable claim can include a digital signature of the first institution and/or a digital signature of the privacy computing unit. The verifiable claim can be stored in the blockchain system.

The verifiable claim (VC) can prove that the basic data of the to-be-identified user is real data, that is, the VC can prove that the KYC check result of the to-be-identified user is real. The VC is also an important application in the DID. The VC can be stored on a blockchain platform. For example, the content of the VC includes the user basic data corresponding to a certain user ID or some user IDs has passed the KYC check of the privacy computing unit and is signed by the privacy computing unit; or includes a hash value of a check result and is signed by the privacy computing unit. Certainly, because the basic data checked by the privacy computing unit is provided by the first institution, the verifiable claim can further include the digital signature of the first institution.

When verifying the KYC check result of the second institution for the user, the regulatory institution can verify the VC by using the blockchain in addition to obtaining the match result from the second institution. Specifically, the regulatory institution can obtain the public key in the DIDdoc of the privacy computing unit from the blockchain, and verify the signature of the VC by using the public key of the privacy computing unit when verifying the check result of the second institution for the user ID, so as to determine that the VC is issued by the privacy computing unit and is complete, that is, the VC is not tampered with. Therefore, the authenticity of the KYC check result provided by the second institution can be improved based on the tamper-resistant characteristic of the blockchain platform and trustworthiness of the signature institution. The trustworthiness of the signature institution, that is, the trustworthiness of the privacy computing unit/second smart contract, can be implemented by auditing the identity of the privacy computing unit and the contract code deployed in the privacy computing unit. The auditing the identity of the privacy computing unit is specifically, for example, the previous challenge process, which can verify that the identity of the privacy computing unit is trustworthy.

According to the previously described method, sending the KYC check result to the second institution can empower the second institution that is previously not capable of performing anti-money laundering work, so that such an institution can have a KYC check result of a user who purchases a financial product of the institution, thereby satisfying a specified anti-money laundering audit obligation, and improving a KYC check capability of the whole industry.

Embodiment 2

Figure 3:
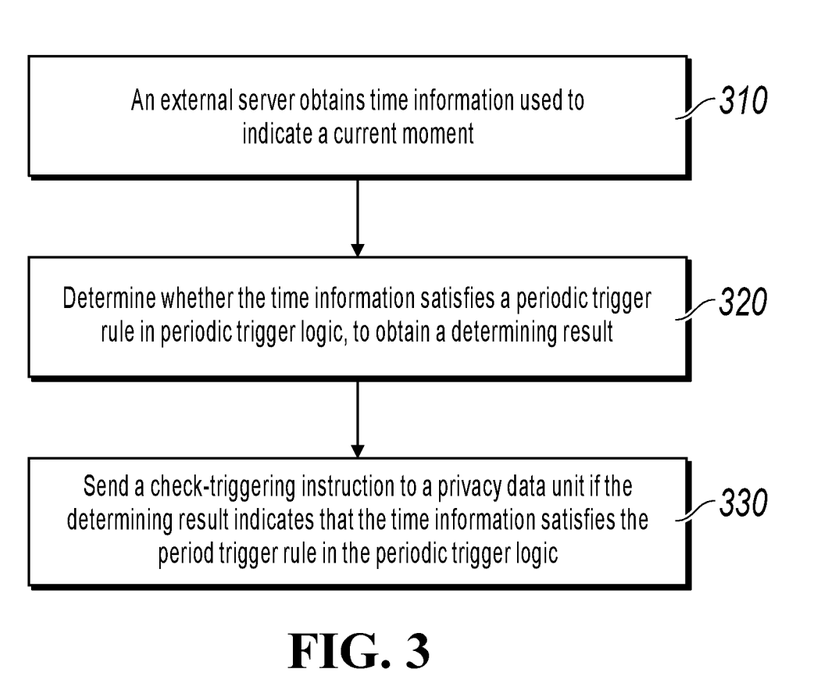
FIG. 3 is a flowchart illustrating a data check trigger method, according to one or more embodiments of the present specification.

FIG. 3 is a flowchart illustrating a data check trigger method, according to one or more embodiments of the present specification. From the perspective of program, the process can be performed by a program or an application client device mounted on an application server. The execution body in the embodiments can be an external server deployed outside a blockchain and a privacy computing unit, and the external server can be configured to periodically trigger the privacy computing unit to execute KYC check of a user. The external server can be alternatively a server cluster. The server cluster can include one or more servers that can exchange data with the blockchain network and the privacy computing unit.

As shown in FIG. 3, the process can include the following steps.

Step 310: The external server obtains time information used to indicate a current moment, where periodic trigger logic is deployed in the external server.

Specifically, the periodic trigger logic can be used to determine a start moment of a first smart contract in the privacy computing unit, and start the first smart contract when the current moment reaches the start moment. The smart contract defines contract code used to complete KYC check of a user.

The time information can be time information of the current moment, or can be time duration information of a timing function in the external server. The external server monitors the time information, and periodically sends a check-triggering instruction to the privacy computing unit to trigger the privacy computing unit to perform KYC check.

Step 320: Determine whether the time information satisfies a periodic trigger rule in the periodic trigger logic, to obtain a determining result.

Step 330: Send a check-triggering instruction to the privacy computing unit if the determining result indicates that the time information satisfies the periodic trigger rule in the periodic trigger logic, where the check-triggering instruction is used to trigger the privacy computing unit to perform a consistency check on basic data of a to-be-identified user based on encrypted standard basic data of the to-be-identified user obtained from a trusted institution, and the basic data of the to-be-identified user is obtained by decrypting encrypted basic data of the to-be-identified user uploaded by a first institution.

Corresponding to the method step in Embodiment 1, in the present step, when detecting that the time information satisfies the periodic trigger rule in the periodic trigger logic, the external server sends the check-triggering instruction to the privacy computing unit to trigger the privacy computing unit to perform the method step in Embodiment 1 to perform KYC check on the to-be-identified user.

In the previous step of FIG. 3, the following methods can be used to trigger the external server to send the check-triggering instruction to the privacy computing unit.

Method 1: Trigger based on time duration. The method can specifically include the following steps:

It is determined whether the time duration reaches the predetermined duration; and the check-triggering instruction is sent to the privacy computing unit if the time duration reaches the predetermined duration. For example, if the predetermined duration is three hours, when detecting that the time duration reaches three hours, the external server can send the check-triggering instruction to the privacy computing unit.

Method 2: Trigger based on a moment. The method can specifically include the following steps:

It is determined whether the current moment reaches the predetermined start moment; and the check-triggering instruction is sent to the privacy computing unit if the current moment reaches the predetermined start moment. For example, if the predetermined start moment is 8:00 and 18:00 every day, the check-triggering instruction is sent to the privacy computing unit at 8:00 and 18:00 every day.

Method 3: Trigger based on both the time information and a data amount of to-be-checked data. The method can specifically include the following steps:

A data amount of to-be-checked data stored in a cloud storage server is obtained if the time duration does not reach the predetermined duration, or if the current moment does not reach the predetermined start moment;

it is determined whether the data amount reaches a predetermined data amount threshold; and the check-triggering instruction is sent to the privacy computing unit if the data amount reaches the predetermined data amount threshold.

It is worthwhile to note that in the solution of the embodiments of the present specification, the external server sends a periodic trigger instruction to actively trigger the privacy computing unit to perform KYC check (actually, to trigger the first smart contract in the privacy computing unit to perform KYC check). However, in actual applications, the privacy computing unit can also be triggered to perform KYC check based on the data amount of the to-be-checked data. Therefore, the following method can be used to trigger the external server to send the check-triggering instruction to the privacy computing unit.

Method 4: Trigger based on a data amount of to-be-checked data. The method can specifically include the following steps:

The external server obtains data amount information of to-be-checked data in a cloud storage server, where the data amount information is a specific value of the data amount of the to-be-checked data;

it is determined whether the data amount of the to-be-checked data reaches a predetermined data amount threshold; and the check-triggering instruction is sent to the privacy computing unit if the data amount of the to-be-checked data reaches the predetermined data amount threshold.

According to the previously described methods, the external server can be triggered to send the check-triggering instruction to the privacy computing unit to trigger the privacy computing unit to perform KYC check, without requiring a related institution to initiate a transaction to trigger KYC check. Therefore, related operations performed by a blockchain node to process a blockchain transaction calling a target smart contract can be reduced, and operations performed by a related institution to initiate a transaction can also be reduced, thereby improving user experience.

According to the method of FIG. 3, the external server actively sends the check-triggering instruction to the privacy computing unit to actively trigger the first smart contract in the privacy computing unit to complete KYC check, so that a related institution does not need to periodically initiate a transaction to call a smart contract. Therefore, related operations performed by the privacy computing unit or the blockchain node to process a transaction calling a smart contract can be reduced, the efficiency of completing a periodic task can be improved, and operations performed by a related institution to initiate a transaction can also be reduced, thereby improving user experience.

Figure 4:
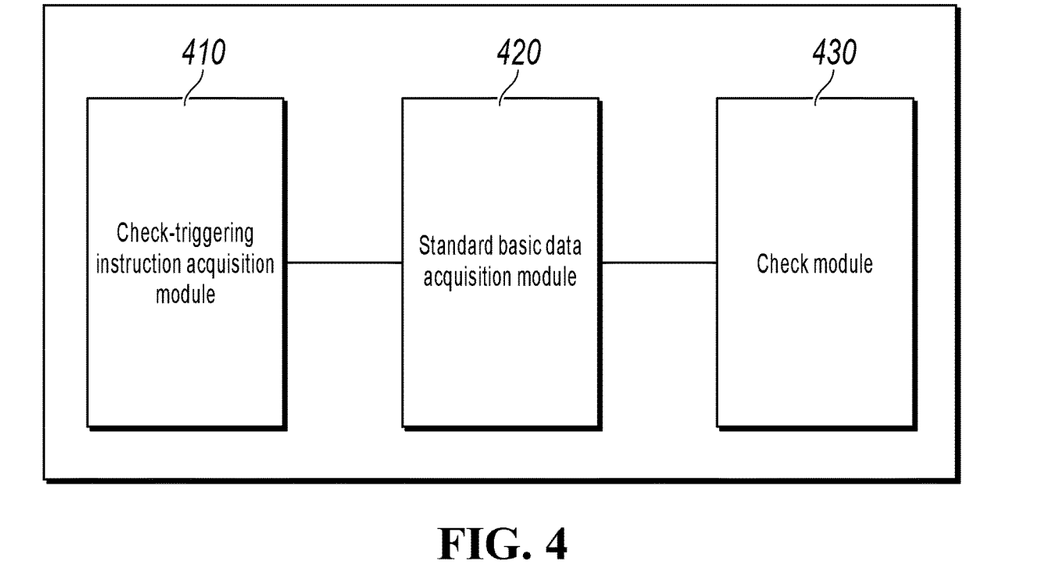
FIG. 4 is a schematic structural diagram illustrating a data check apparatus, according to one or more embodiments of the present specification.

Based on the same idea, one or more embodiments of the present specification further provide an apparatus corresponding to the method in Embodiment 1. FIG. 4 is a schematic structural diagram illustrating a data check apparatus, according to one or more embodiments of the present specification. As shown in FIG. 4, the apparatus is applied to a privacy computing unit, and the apparatus can include:

a check-triggering instruction acquisition module 410, configured to obtain a check-triggering instruction sent by an external server;

a standard basic data acquisition module 420, configured to obtain encrypted standard basic data of a to-be-identified user from a trusted institution in response to the check-triggering instruction; and a check module 430, configured to perform a consistency check on basic data of the to-be-identified user based on the standard basic data, where the basic data of the to-be-identified user is obtained by decrypting encrypted basic data of the to-be-identified user uploaded by a first institution.

Based on the apparatus of FIG. 4, the embodiments of the present specification further provide some specific implementation solutions of the apparatus, which are described below.

Optionally, the check-triggering instruction obtained by the check-triggering instruction acquisition module 410 is sent by the external server based on a periodic trigger rule.

Optionally, the periodic trigger rule can include predetermined duration or a predetermined start moment.

Optionally, the encrypted basic data of the to-be-identified user uploaded by the first institution can be stored in a cloud storage server.

Optionally, the apparatus can further include:

a basic data acquisition module, configured to obtain, based on user identification information of the to-be-identified user from the cloud storage server, the encrypted basic data of the to-be-identified user corresponding to the user identification information.

Optionally, the user identification information can include:

an account that the to-be-identified user registers with the first institution; or an account allocated by a system of the first institution to the to-be-identified user when the to-be-identified user initiates a transaction operation to the first institution.

Optionally, the user identification information can include:

a digest value obtained by performing hash calculation on one or more pieces of information of the to-be-identified user.

Optionally, the user identification information can include:

a digest value obtained by performing salted hash calculation on one or more pieces of information of the to-be-identified user.

Optionally, the privacy computing unit can be a privacy computing unit deployed in a blockchain system or a privacy computing unit deployed in a device outside a blockchain system, and the first institution can be a consignment agency.

Optionally, the apparatus can further include:

a decryption module, configured to decrypt the encrypted standard basic data of the to-be-identified user obtained from the trusted institution, to obtain the standard basic data.

Optionally, the check module 430 can specifically include:

a comparison unit, configured to compare the basic data of the to-be-identified user with the standard basic data to obtain a check result;

a real data determining unit, configured to: when the check result indicates that the basic data of the to-be-identified user is consistent with the standard basic data, determine that the basic data of the to-be-identified user uploaded by the first institution is real data; and a false data determining unit, configured to: when the check result indicates that the basic data of the to-be-identified user is inconsistent with the standard basic data, determine that the basic data of the to-be-identified user uploaded by the first institution is false data.

Optionally, the check module 430 can further include:

a check result acquisition request receiving unit, configured to receive, by the privacy computing unit, a check result acquisition request sent by a second institution, where the check result acquisition request is used to request to obtain the check result obtained by performing a consistency check on the basic data of the to-be-identified user based on the standard basic data, and the check result acquisition request includes user identification information of the to-be-identified user; and a check result sending unit, configured to send the check result to the second institution based on the check result acquisition request, where the second institution is a financial institution.

Optionally, a first smart contract can be deployed in the privacy computing unit, and the first smart contract is used to receive the check-triggering instruction sent by the external server, and perform the operation of performing a consistency check on the basic data of the to-be-identified user based on the standard basic data in response to the check-triggering instruction.

Optionally, the check module 430 can further include:

a verifiable claim generation unit, configured to generate, by the privacy computing unit, a verifiable claim used to prove that the basic data of the to-be-identified user uploaded by the first institution is real data, where the verifiable claim includes a digital signature of the first institution and/or a digital signature of the privacy computing unit.

Optionally, the check module 430 can further include:

a verifiable claim storage unit, configured to send the verifiable claim to a blockchain system for storage.

Optionally, a second smart contract can be further deployed in the privacy computing unit.

Optionally, the check result sending unit can be specifically configured to:

call the second smart contract to send the check result to the second institution.

Optionally, the apparatus can further include:

an identity proving module of a first privacy computing unit, configured to prove, by the privacy computing unit, an identity of the privacy computing unit to the first institution and/or the cloud storage server.

Optionally, the apparatus can further include:

An identity proving module of a second privacy computing unit, configured to prove, by the privacy computing unit, an identity of the privacy computing unit to the trusted institution.

Optionally, the apparatus can further include:

a trusted institution identity verification module, configured to verify, by the privacy computing unit, identity information of the trusted institution.

Figure 5:
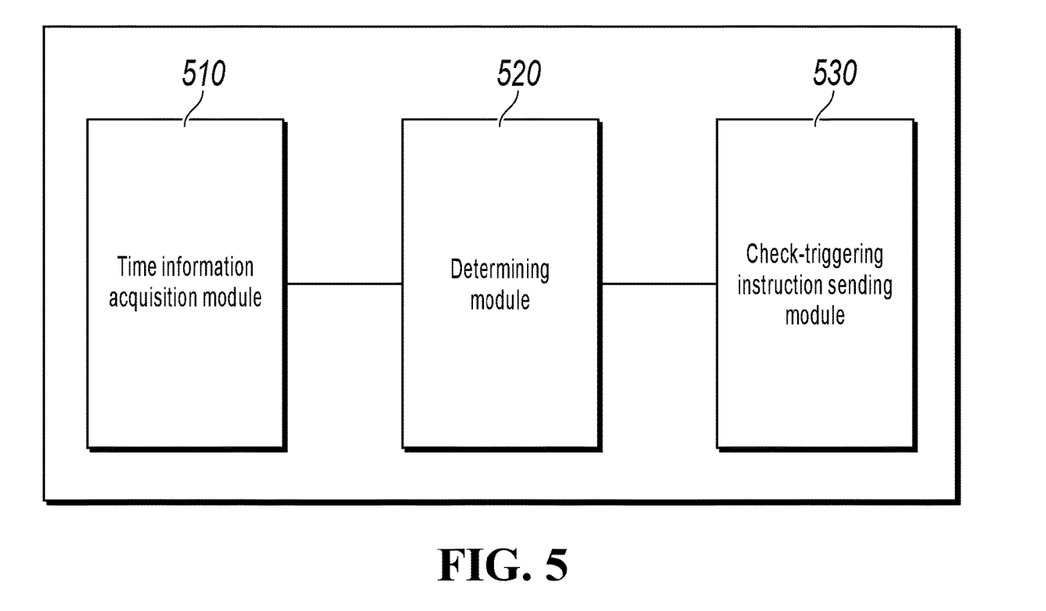
FIG. 5 is a schematic structural diagram illustrating a data check trigger apparatus, according to one or more embodiments of the present specification.

Based on the same idea, one or more embodiments of the present specification further provide an apparatus corresponding to the method in Embodiment 2. FIG. 5 is a schematic structural diagram illustrating a data check trigger apparatus, according to one or more embodiments of the present specification. As shown in FIG. 5, the apparatus can include:

a time information acquisition module 510, configured to obtain, by an external server, time information used to indicate a current moment, where periodic trigger logic is deployed in the external server;

a determining module 520, configured to determine whether the time information satisfies a periodic trigger rule in the periodic trigger logic, to obtain a determining result; and a check-triggering instruction sending module 530, configured to send a check-triggering instruction to a privacy computing unit if the determining result indicates that the time information satisfies the periodic trigger rule in the periodic trigger logic, where the check-triggering instruction is used to trigger the privacy computing unit to perform a consistency check on basic data of a to-be-identified user based on encrypted standard basic data of the to-be-identified user obtained from a trusted institution, and the basic data of the to-be-identified user is obtained by decrypting encrypted basic data of the to-be-identified user uploaded by a first institution.

Based on the apparatus of FIG. 5, the embodiments of the present specification further provide some specific implementation solutions of the apparatus, which are described below.

Optionally, the periodic trigger rule can be triggering when time duration reaches predetermined duration; or the periodic trigger rule can be triggering when the current moment reaches a predetermined start moment.

Optionally, the apparatus can further include:

a data amount acquisition module for to-be-checked data, configured to obtain a data amount of to-be-checked data stored in a cloud storage server if the determining result indicates that the time information does not satisfy the periodic trigger rule in the periodic trigger logic; and a data amount determining module, configured to determine whether the data amount reaches a predetermined data amount threshold, where the check-triggering instruction sending module is configured to send the check-triggering instruction to the privacy computing unit if the data amount reaches the predetermined data amount threshold.

Based on the same idea, one or more embodiments of the present specification further provide a device corresponding to the method in the previous embodiments.

Figure 6:
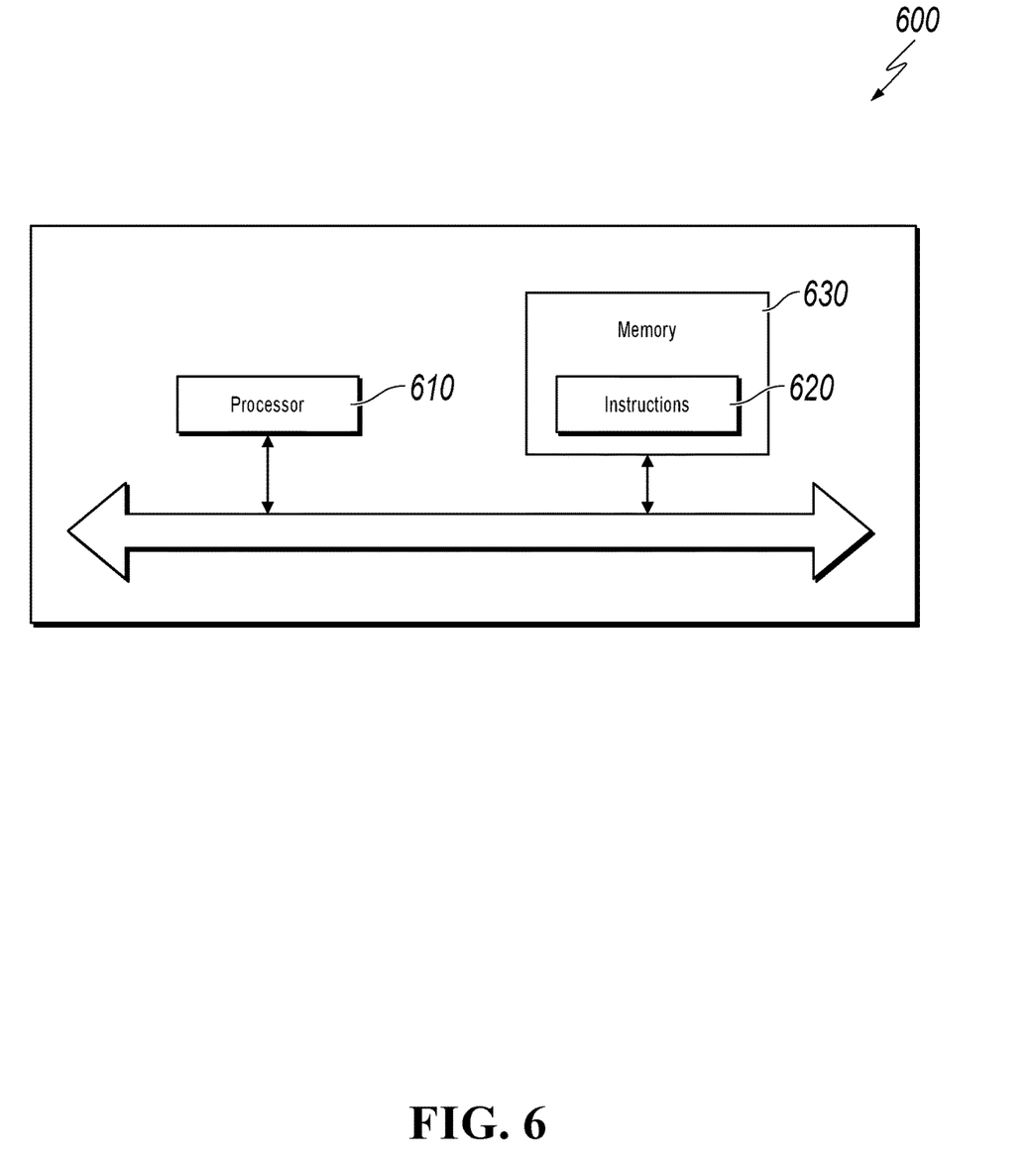
FIG. 6 is a schematic structural diagram illustrating a data check device, according to one or more embodiments of the present specification.

FIG. 6 is a schematic structural diagram illustrating a data check device, according to one or more embodiments of the present specification. As shown in FIG. 6, the device 600 can include:

at least one processor 610; and a memory 630 communicatively connected to the at least one processor, where the memory 630 stores instructions 620 that can be executed by the at least one processor 610, and the instructions are executed by the at least one processor 610.

Corresponding to Embodiment 1, in a data check device, the instructions 620 can enable the at least one processor 610 to:

obtain a check-triggering instruction sent by an external server;

obtain encrypted standard basic data of a to-be-identified user from a trusted institution in response to the check-triggering instruction; and perform a consistency check on basic data of the to-be-identified user based on the standard basic data, where the basic data of the to-be-identified user is obtained by decrypting encrypted basic data of the to-be-identified user uploaded by a first institution.

Corresponding to Embodiment 2, in a data check trigger device, the instructions 620 can enable the at least one processor 610 to:

obtain time information used to indicate a current moment, where periodic trigger logic is deployed in the external server;

determine whether the time information satisfies a periodic trigger rule in the periodic trigger logic, to obtain a determining result; and send a check-triggering instruction to a privacy computing unit if the determining result indicates that the time information satisfies the periodic trigger rule in the periodic trigger logic, where the check-triggering instruction is used to trigger the privacy computing unit to perform a consistency check on basic data of a to-be-identified user based on encrypted standard basic data of the to-be-identified user obtained from a trusted institution, and the basic data of the to-be-identified user is obtained by decrypting encrypted basic data of the to-be-identified user uploaded by a first institution.

The embodiments of the present specification are described in a progressive way. For same or similar parts of the embodiments, references can be made to the embodiments. Each embodiment focuses on a difference from other embodiments. In particular, the embodiments for the data check device/data check trigger device shown in FIG. 6 are basically similar to the method embodiments, and therefore are described briefly. For related parts, references can be made to descriptions in the method embodiments.

In the 1990s, whether a technical improvement is a hardware improvement (for example, an improvement to a circuit structure, e.g., a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (e.g., a field programmable gate array (FPGA)) is such an integrated circuit, and a logical function of the PLD is determined by a user through device program-ming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer readable medium that stores computer readable program code (e.g., software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the above embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

Although the one or more embodiments of the present specification provide the operation steps of the method in the embodiments or flowcharts, the conventional or non-creative means can include more or fewer operation steps. The sequence of the steps listed in the embodiments is merely one of numerous step execution sequences, and does not represent the unique execution sequence. In actual execution of an apparatus or a terminal product, execution can be performed based on a method sequence shown in the embodiments or the accompanying drawings, or performed in parallel (for example, a concurrent processor or a multi-thread processing environment, or even a distributed data processing environment). Terms "include", "contain", or their any other variants are intended to cover a non-exclusive inclusion, so that a process, a method, a product, or a device that includes a series of elements not only includes those elements but also includes other elements which are not expressly listed, or further includes elements inherent to such a process, method, product, or device. Without more constraints, an element preceded by "includes a . . . " does not preclude the existence of additional identical or similar elements in the process, method, product, or device that includes the element. The words such as "first" and "second" are used to indicate names instead of any particular order.

For ease of description, the previous apparatus is divided into multiple units based on functions during description of the apparatus. Certainly, when the present application is implemented, a function of each unit can be implemented in one or more pieces of software and/or hardware.

A person skilled in the art should understand that an embodiment of the present disclosure can be provided as a method, a system, or a computer program product. Therefore, the present disclosure can use a form of hardware only embodiments, software only embodiments, or embodiments with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the embodiments of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct a computer or another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPU), one or more input/output interfaces, one or more network interfaces, and one or more memories.

The memory may include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. A computer storage medium includes but is not limited to a phase change random access memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product, or a device that includes a series of elements not only includes those elements but also includes other elements which are not expressly listed, or further includes elements inherent to such a process, method, product, or device. Without more constraints, an element preceded by "includes a . . . " does not preclude the existence of additional identical elements in the process, method, product, or device that includes the element.

A person skilled in the art should understand that embodiments of the present application can be provided as a method, a system, or a computer program product. Therefore, the present application can use a form of hardware only embodiments, software only embodiments, or embodiments with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In the distributed computing environment, the program module can be located in both local and remote computer storage media including storage devices.

The previous descriptions are embodiments of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
retrieving, by a trusted execution environment (TEE) on an off-chain computer, a check-triggering instruction from a server, wherein
the check-triggering instruction triggers the TEE to perform a consistency check on basic data of a user to be identified, wherein the basic data of the user comprises user identification information of the user, and
the TEE on the off-chain computer is verified as trustworthy by a trusted institution that is an authentication server;
in response to the check-triggering instruction, retrieving, by the TEE, encrypted standard basic data of the user from the trusted institution;
retrieving, by the TEE, encrypted basic data of the user from a first institution;
retrieving, by the TEE, the basic data of the user by decrypting the encrypted basic data;
performing, by the TEE, the consistency check on the basic data of the user based on the encrypted standard basic data to obtain a check result, wherein the consistency check comprises know your customer (KYC) check; and
in response to receiving an acquisition request from a second institution, sending, from the TEE, the check result to the second institution.

2. The computer-implemented method of claim 1, comprising:
retrieving, by the TEE, the encrypted basic data based on the user identification information of the user from a cloud storage server, wherein the encrypted basic data is uploaded by the first institution to the cloud storage server.

3. The computer-implemented method of claim 2, wherein the user identification information comprises an account registered by the user at the first institution or assigned to the user by the first institution in response to an operation initiated by the user at the first institution.

4. The computer-implemented method of claim 1, comprising:
decrypting the encrypted standard basic data of the user to obtain standard basic data.

5. The computer-implemented method of claim 4, wherein performing the consistency check on the basic data of the user based on the encrypted standard basic data comprises:
comparing the basic data of the user with the standard basic data; and
determining that the basic data is real data in response to the check result indicating that the basic data is the same as the standard basic data, or determining that the basic data is false data in response to the check result indicating that the basic data is not the same as the standard basic data.

6. The computer-implemented method of claim 1, comprising:
receiving, by the TEE, a check result acquisition request from the second institution, wherein the check result acquisition request is configured to request the check result.

7. The computer-implemented method of claim 6, wherein the check result acquisition request comprises the user identification information of the user.

8. A non-transitory, computer-readable medium storing one or more instructions executable by a computer system to perform operations comprising:
retrieving, by a trusted execution environment (TEE) on an off-chain computer, a check-triggering instruction from a server, wherein
the check-triggering instruction triggers the TEE to perform a consistency check on basic data of a user to be identified, wherein the basic data of the user comprises user identification information of the user, and
the TEE on the off-chain computer is verified as trustworthy by a trusted institution that is an authentication server;
in response to the check-triggering instruction, retrieving, by the TEE, encrypted standard basic data of the user from the trusted institution;
retrieving, by the TEE, encrypted basic data of the user from a first institution;
retrieving, by the TEE, the basic data of the user by decrypting the encrypted basic data;
performing, by the TEE, the consistency check on the basic data of the user based on the encrypted standard basic data to obtain a check result, wherein the consistency check comprises know your customer (KYC) check; and
in response to receiving an acquisition request from a second institution, sending, from the TEE, the check result to the second institution.

9. The non-transitory, computer-readable medium of claim 8, wherein the operations comprise:
retrieving, by the TEE, the encrypted basic data based on the user identification information of the user from a cloud storage server, wherein the encrypted basic data is uploaded by the first institution to the cloud storage server.

10. The non-transitory, computer-readable medium of claim 9, wherein the user identification information comprises an account registered by the user at the first institution or assigned to the user by the first institution in response to an operation initiated by the user at the first institution.

11. The non-transitory, computer-readable medium of claim 8, wherein the operations comprise:
decrypting the encrypted standard basic data of the user to obtain standard basic data.

12. The non-transitory, computer-readable medium of claim 11, wherein performing the consistency check on the basic data of the user based on the encrypted standard basic data comprises:
comparing the basic data of the user with the standard basic data; and
determining that the basic data is real data in response to the check result indicating that the basic data is the same as the standard basic data, or determining that the basic data is false data in response to the check result indicating that the basic data is not the same as the standard basic data.

13. The non-transitory, computer-readable medium of claim 8, wherein the operations comprise:
receiving, by the TEE, a check result acquisition request from the second institution, wherein the check result acquisition request is configured to request the check result.

14. The non-transitory, computer-readable medium of claim 13, wherein the check result acquisition request comprises the user identification information of the user.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
retrieving, by a trusted execution environment (TEE) on an off-chain computer, a check-triggering instruction from a server, wherein
the check-triggering instruction triggers the TEE to perform a consistency check on basic data of a user to be identified, wherein the basic data of the user comprises user identification information of the user, and
the TEE on the off-chain computer is verified as trustworthy by a trusted institution that is an authentication server;
in response to the check-triggering instruction, retrieving, by the TEE, encrypted standard basic data of the user from the trusted institution;
retrieving, by the TEE, encrypted basic data of the user from a first institution;
retrieving, by the TEE, the basic data of the user by decrypting the encrypted basic data;
performing, by the TEE, the consistency check on the basic data of the user based on the encrypted standard basic data to obtain a check result, wherein the consistency check comprises know your customer (KYC) check; and
in response to receiving an acquisition request from a second institution, sending, from the TEE, the check result to the second institution.

16. The computer-implemented system of claim 15, wherein the one or more operations comprise:
retrieving, by the TEE, the encrypted basic data based on the user identification information of the user from a cloud storage server, wherein the encrypted basic data is uploaded by the first institution to the cloud storage server.

17. The computer-implemented system of claim 16, wherein the user identification information comprises an account registered by the user at the first institution or assigned to the user by the first institution in response to an operation initiated by the user at the first institution.

18. The computer-implemented system of claim 15, wherein the one or more operations comprise:
decrypting the encrypted standard basic data of the user to obtain standard basic data.

19. The computer-implemented system of claim 18, wherein performing the consistency check on the basic data of the user based on the encrypted standard basic data comprises:
comparing the basic data of the user with the standard basic data; and
determining that the basic data is real data in response to the check result indicating that the basic data is the same as the standard basic data, or determining that the basic data is false data in response to the check result indicating that the basic data is not the same as the standard basic data.

20. The computer-implemented system of claim 15, wherein the one or more operations comprise:
receiving, by the TEE, a check result acquisition request from the second institution, wherein the check result acquisition request is configured to request the check result.

* * * * *